United States Patent
Ryu (10) Patent No.: US 9,467,428 B2
(45) Date of Patent: Oct. 11, 2016

(54) INFORMATION SECURITY ATTACHMENT DEVICE FOR VOICE COMMUNICATION AND INFORMATION SECURITY METHOD FOR VOICE COMMUNICATION USING THE SAME

(71) Applicant: ELECTRONICS AND TELECOMMUNICATIONS RESEARCH INSTITUTE, Daejeon (KR)

(72) Inventor: Hyungyul Ryu, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 209 days.

(21) Appl. No.: 14/283,370

(22) Filed: May 21, 2014

(65) Prior Publication Data

US 2016/0119303 A1    Apr. 28, 2016

(30) Foreign Application Priority Data

May 27, 2013   (KR) .................. 10-2013-0059839

(51) Int. Cl.
*H04K 1/10* (2006.01)
*H04L 29/06* (2006.01)
*H04W 12/02* (2009.01)

(52) U.S. Cl.
CPC ......... *H04L 63/061* (2013.01); *H04L 63/0428* (2013.01); *H04L 63/0876* (2013.01); *H04L 69/04* (2013.01); *H04W 12/02* (2013.01)

(58) Field of Classification Search
CPC .................... H04L 63/0876; H04L 63/061
USPC ......................................... 380/33
See application file for complete search history.

(56) References Cited

U.S. PATENT DOCUMENTS 4,827,507 A * 5/1989 Marry .................... H04K 1/04
                                                           380/275
5,963,621 A * 10/1999 Dimolitsas .......... H04L 63/0428
                                                           358/442
(Continued)

FOREIGN PATENT DOCUMENTS

CN        1754366 A      3/2006
CN       101088262 A    12/2007
(Continued)

OTHER PUBLICATIONS

Patrick H. Potega; Intra-Cabin Wireless Data Network; IEEE; year:1998; p. 1-8.*

*Primary Examiner* — Monjour Rahim
(74) *Attorney, Agent, or Firm* — LRK Patent Law Firm (57) ABSTRACT

An information security attachment device for voice communication and an information security method for voice communication using the same are provided. The information security attachment device includes a user interface unit, a compression unit, an encryption and decryption unit, and a conversion unit. The user interface unit receives an information security request from a user, and displays whether or not information security is being performed. The compression unit compresses a voice signal. The encryption and decryption unit encrypts the compressed voice data in response to an information security request or an information security control command, requests a terminal to send the encrypted voice data, decrypts the encrypted voice data in response to an information security request or an information security control command, and outputs the decrypted voice data. The conversion unit restores the voice data to an analog voice signal, and outputs the restored analog voice signal.

15 Claims, 5 Drawing Sheets

(56) References Cited

U.S. PATENT DOCUMENTS

| | | | | |
|---|---|---|---|---|
| 5,974,043 | A * | 10/1999 | Solomon | H04M 11/06 370/352 |
| 6,842,523 | B1 * | 1/2005 | Niwa | H04L 9/0894 380/278 |
| 8,526,616 | B2 * | 9/2013 | Feudo | H04L 9/321 380/247 |
| 2002/0183005 | A1 | 12/2002 | Yi et al. | |
| 2003/0009659 | A1 * | 1/2003 | DiSanto | H04K 1/00 713/151 |
| 2004/0009775 | A1 * | 1/2004 | Kang | H04W 12/04 455/450 |
| 2005/0265546 | A1 * | 12/2005 | Suzuki | H04L 9/0662 380/44 |
| 2006/0116107 | A1 * | 6/2006 | Hulvey | H04M 1/6066 455/411 |
| 2006/0143455 | A1 | 6/2006 | Gitzinger | |
| 2006/0198520 | A1 * | 9/2006 | Courtney | H04L 1/0056 380/247 |
| 2009/0222659 | A1 * | 9/2009 | Miyabayashi | H04L 63/0823 713/156 |
| 2010/0166182 | A1 * | 7/2010 | Berggren | H04K 1/00 380/257 |
| 2010/0220850 | A1 * | 9/2010 | Gisby | H04K 1/00 379/211.02 |

FOREIGN PATENT DOCUMENTS

| | | |
|---|---|---|
| CN | 101304306 A | 11/2008 |
| CN | 101567885 A | 10/2009 |
| CN | 102843677 A | 12/2012 |
| KR | 10-2002-0089742 A | 11/2002 |
| KR | 10-2007-0060302 A | 6/2007 |
| KR | 10-2011-0100373 A | 9/2011 |
| KR | 10-1107241 B1 | 1/2012 |
| WO | 2004/057827 A2 | 7/2004 |
| WO | 2007/066943 A1 | 6/2007 |

* cited by examiner

INFORMATION SECURITY ATTACHMENT DEVICE FOR VOICE COMMUNICATION AND INFORMATION SECURITY METHOD FOR VOICE COMMUNICATION USING THE SAME

CROSS REFERENCE TO RELATED APPLICATIONS

This application claims the benefit of Korean Patent Application No. 10-2013-0059839, filed on May 27, 2013, which is hereby incorporated by reference in its entirety into this application.

BACKGROUND OF THE INVENTION

1. Technical Field

The present invention relates generally to an information security attachment device for voice communication and an information security method for voice communication using the same and, more particularly, to an apparatus and method that are capable of providing an information security function for voice communication using a commercial mobile terminal or a wired telephone.

2. Description of the Related Art

With the development of technology, many users exchange information using various types of devices, such as mobile terminals or wired telephones.

However, a wired telephone is exposed to wire tapping, and a mobile terminal does not provide end-to-end information security but provides a security function only for information transmitted in a wireless section between the mobile terminal and a base station. As a result, they have the danger of malicious eavesdropping or wire tapping.

The mobile terminal or the wired telephone also provides a call function via a hand-free headset or a wireless telephone receiver for convenience of a user.

Accordingly, a section between the headset and the terminal or a section between the wireless telephone receiver and the terminal also has the danger of wire tapping. Some headsets provide a security function for information in a section of connection with a mobile terminal, but have the possibility of wire tapping in other sections.

Korean Patent No. 1107241 discloses an apparatus and method for providing speech secure communication in which, after a mobile terminal is connected to a dongle for cipher communication, authentication is performed between dongles for cipher communication on the transmission and reception sides in the state in which a communication path has been set up, the dongles for cipher communication on the transmission and reception sides perform encryption on transmission data and decryption on reception data when the authentication is successful, thereby providing cipher communication via the dongles for cipher communication.

Korean Patent No. 1107241 provides a method in which a first mobile terminal and a second mobile terminal are connected over a network and provide cipher communication, including (a) when a first dongle for cipher communication that is connected to the first mobile terminal receives a request for cipher communication from the first mobile terminal, providing sync information including an encryption key to a second dongle for cipher communication that is connected to the second mobile terminal via the second mobile terminal; (b) determining, by the second dongle for cipher communication, whether or not the sync information is normal; (c) if, as a result of the determination, it is determined that the sync information is normal, extracting, by the second dongle for cipher communication, the encryption key from the sync information, entering cipher communication mode according to the encryption key, and providing, by the second dongle for cipher communication, the first dongle for cipher communication with information that provides notification of the entry of cipher communication mode sequentially via the second mobile terminal and the first mobile terminal, and if, as a result of the determination, it is determined that the sync information is not normal, performing, by the second dongle for cipher communication, a corresponding operation; (d) entering, by the first dongle for cipher communication, cipher communication mode according to the encryption key included in the sync information; (e) when the first dongle for cipher communication enters cipher communication mode, encrypting, by the first and the second dongles for cipher communication, voice information or data received via headsets according to the encryption key, providing, by the first and the second dongles for cipher communication, the encrypted voice information or data to the first and the second mobile terminals connected to the first and the second dongles, decrypting, by the first and the second dongles for cipher communication, voice information or data received from the first and the second mobile terminals according to the encryption key, and outputting, by the first and the second dongles for cipher communication, the decrypted voice information or data to the headsets.

The mobile terminal described in Korean Patent No. 1107241 should issue an information security command to the dongle for information security communication. Since the dongle for information security communication performs an information security function, the section between the dongle for information security communication and the headset is not an information security section.

SUMMARY OF THE INVENTION

Accordingly, the present invention has been made keeping in mind the above problems occurring in the prior art, and an object of the present invention is to provide an information security attachment device for voice communication and an information security method for voice communication using the same, which are capable of preventing illegal access by a third party by protecting user voice information transmitted via a mobile terminal or wired telephone to which an attachment apparatus, such as a headset, can be connected in an end-to-end manner.

In accordance with an aspect of the present invention, there is provided an information security attachment device for voice communication, including a user interface unit configured to receive an information security request from a user, and to display whether or not information security is being performed; a compression unit configured to compress a voice signal received from the user by digitizing the voice signal; an encryption and decryption unit configured to encrypt the compressed voice data in response to an information security request from the user or an information security control command of a counterpart information security attachment device, to request a terminal to send the encrypted voice data, to decrypt the encrypted voice data received from the terminal in response to an information security request from the user or an information security control command of the counterpart information security attachment device, and to output the decrypted voice data; and a conversion unit configured to restore the voice data decrypted by the encryption and decryption unit to an analog voice signal, and to output the restored analog voice signal.

When the information security request or the information security control command of the counterpart information security attachment device is received in common call mode, the encryption and decryption unit may enter information security control mode, may exchange keys with the counterpart information security attachment device, may encrypt the compressed voice data when the exchange of keys is completed, and may request the terminal to send the encrypted voice data.

When the information security request or the information security control command of the counterpart information security attachment device is received in common call mode, the encryption and decryption unit may enter information security control mode, may exchange keys with the counterpart information security attachment device, may decrypt the encrypted voice data received from the terminal when the exchange of keys is completed, and may output the decrypted voice data.

The encryption and decryption unit may exchange encryption keys for encryption and decryption with the counterpart information security attachment device via a key exchange protocol in order to perform an information security function, and may perform the information security function on the voice data based on the encryption key.

The encryption and decryption unit may include a command processing unit configured to generate an information security control command in response to the information security request, and to determine whether or not to perform information security by analyzing the information security control command received from the terminal; an encryption determination unit configured to activate information security mode for the voice data, compressed by the compression unit, in response to the information security control command from the command processing unit; an encryption processing unit configured to encrypt the voice data compressed by the compression unit when the information security mode is activated by the encryption determination unit; a transmission processing unit configured to send the information security control command of the command processing unit to the terminal, and to send the voice data encrypted by the encryption processing unit to the terminal; a decryption determination unit configured to determine whether or not to decrypt the voice data received by the terminal when the information security mode is activated by the command processing unit; a decryption processing unit configured to decrypt the voice data received by the terminal when the decryption determination unit determines to decrypt the received voice data; and a reception processing unit configured to send the information security control command, received by the terminal, to the command processing unit, and to send the voice data, received by the terminal, to the decryption determination unit.

The transmission processing unit may connect the information security control command and the identifier of the information security control command when the information security control command is received via the command processing unit, and may send the information security control command instead of the voice data to the terminal in an in-band signaling manner.

The transmission processing unit may send the voice data, encrypted by the encryption processing unit, to the terminal when information security call mode is entered by exchanging the information security control commands with the terminal.

The decryption processing unit may perform a decryption operation on the encrypted voice data received from the reception processing unit using a method corresponding to the encryption processing unit, and may send the results of the decryption operation to the conversion unit.

The command processing unit may determine the initiation and termination of an information security function by analyzing the information security control command received via the user interface unit and the reception processing unit.

The user interface unit may include an input unit configured to receive a request for and termination of a call and a request for and termination of information security; and a display unit configured to display call status and whether or not information security is being performed.

The information security attachment device may further include a channel transmission and reception unit configured to transmit and receive the voice data and the information security control command between the encryption and decryption unit and the terminal.

The terminal may include a mobile terminal or a wired telephone.

In accordance with another aspect of the present invention, there is provided an information security method for voice communication, including receiving, by a user interface unit, an information security request from a user, and displaying, by the user interface unit, whether or not information security is being performed; compressing, by a compression unit, a voice signal received from the user by digitizing the voice signal; encrypting, by an encryption and decryption unit, the compressed voice data in response to an information security request from the user or an information security control command of a counterpart information security attachment device, and requesting, by the encryption and decryption unit, a terminal to send the encrypted voice data; decrypting, by the encryption and decryption unit, encrypted voice data received from the terminal in response to an information security request from the user or an information security control command of the counterpart information security attachment device, and outputting, by the encryption and decryption unit, the decrypted voice data; and restoring, by a conversion unit, the decrypted and output voice data to an analog voice signal, and outputting, by the conversion unit, the restored analog voice signal.

Encrypting the compressed voice data and sending the encrypted voice data to the terminal may include entering information security control mode when the information security request or the information security control command is received in common call mode, and exchanging keys with the counterpart information security attachment device; and encrypting the compressed voice data when the exchange of keys is completed, and requesting the terminal to send the encrypted voice data.

Decrypting the encrypted voice data and outputting the decrypted voice data may include entering information security control mode when the information security request or the information security control command is received in common call mode, and exchanging keys with the counterpart information security attachment device; and decrypting the encrypted voice data received from the terminal when the exchange of keys is completed, and outputting the decrypted voice data.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

An information security attachment device for voice communication and an information security method for voice communication using the same according to embodiments of the present invention will be described below with reference to the accompanying drawings. Prior to the following detailed description of the present invention, it should be noted that the terms and words used in the specification and the claims should not be construed as being limited to ordinary meanings or dictionary definitions. Meanwhile, the embodiments described in the specification and the configurations illustrated in the drawings are merely examples, and do not exhaustively present the technical spirit of the present invention. Accordingly, it should be appreciated that there may be various equivalents and modifications that can replace the examples at the time at which the present application is filed.

Figure 1:
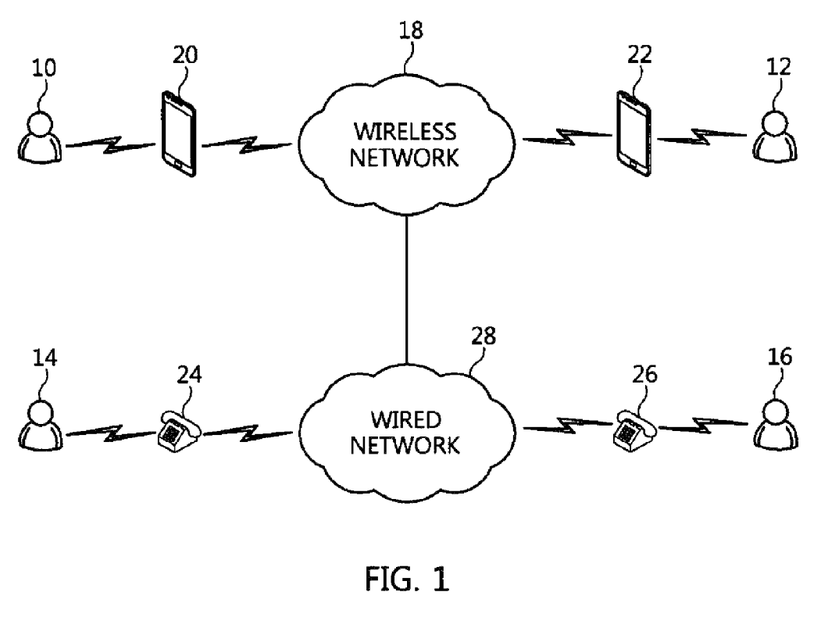
FIG. 1 is a diagram illustrating the configuration of a network to which an information security attachment device for voice communication according to an embodiment of the present invention has been applied.

FIG. 1 is a diagram illustrating the configuration of a network to which an information security attachment device for voice communication according to an embodiment of the present invention has been applied.

Referring to FIG. 1, users 10 and 12 who wear headsets for information security, each of which is a kind of information security attachment device for voice communication according to the present invention, may connect commercial mobile terminals 20 and 22 to respective information security attachment devices, and may then perform voice communication whose information has been secured with counterparts who own the information security attachment devices over a wireless network 18. An information security attachment device for voice communication refers to a device for preventing illegal access by a third party by protecting user voice information transmitted through a mobile terminal or a wired telephone that can be connected to an attachment apparatus, such as a headset, in an end-to-end manner. Accordingly, the information security attachment device for voice communication according to the present invention may be considered to be connected to a commercial mobile terminal or a commercial digital wired telephone and then used.

Furthermore, users 14 and 16 who use receivers for information security may connect commercial wired telephones 24 and 26 to respective information security attachment devices, and may then perform voice communication whose information has been secured with counterparts who own the information security attachment devices over a wired network 28.

The users 10 and 12 who use the headsets for information security and the users 14 and 16 who use the receivers for information security may connect the commercial mobile terminals 20 and 22 and the wired telephones 24 and 26 to the respective information security attachment devices, and may then perform voice communication whose information has been secured with the counterparts who own the information security attachment devices over the wired or wireless networks 18 and 28.

The operating principle of the voice information security function of the information security attachment device for voice communication will be described below by taking as an example a situation in which a call is made through connection between the mobile terminals 20 and 22 or the wired telephones 24 and 26.

For example, when one of the users (hereinafter also referred to as "callers") 12 and 16 who have the information security attachment devices for voice communication on both sides requests an information security function in a situation in which a common call is being performed, a key exchange protocol is performed between the information security attachment devices for voice communication of the callers 12 and 16 on both sides using an information security control command (e.g., having a specific message form) in order to perform the function of the information security of a channel via which voice information is exchanged. When the procedure of performing the key exchange protocol is normally completed, the information security attachment devices for voice communication of the callers 12 and 16 on both sides generate an information security channel and perform a call while protecting voice information. As a result, when an information security request is received from a user who uses an information security attachment device A for voice communication or an information security control command is received from a counterpart information security attachment device (i.e., an information security attachment device B for voice communication), the information security attachment device A for voice communication performs a key exchange protocol along with a counterpart information security attachment device and then performs encryption and decryption.

In common call mode, the information security attachment devices for voice communication of the callers 12 and 16 on both sides exchange voice information through the mobile terminal 22 and the wired telephone 26. In information security call mode, the information security attachment devices for voice communication of the callers 12 and 16 exchange voice information that has been secured. Furthermore, if an information security function is activated or deactivated, the information security attachment devices for voice communication of the callers 12 and 16 exchange information security control commands (e.g., having a specific message form) instead of voice information.

Figure 2:
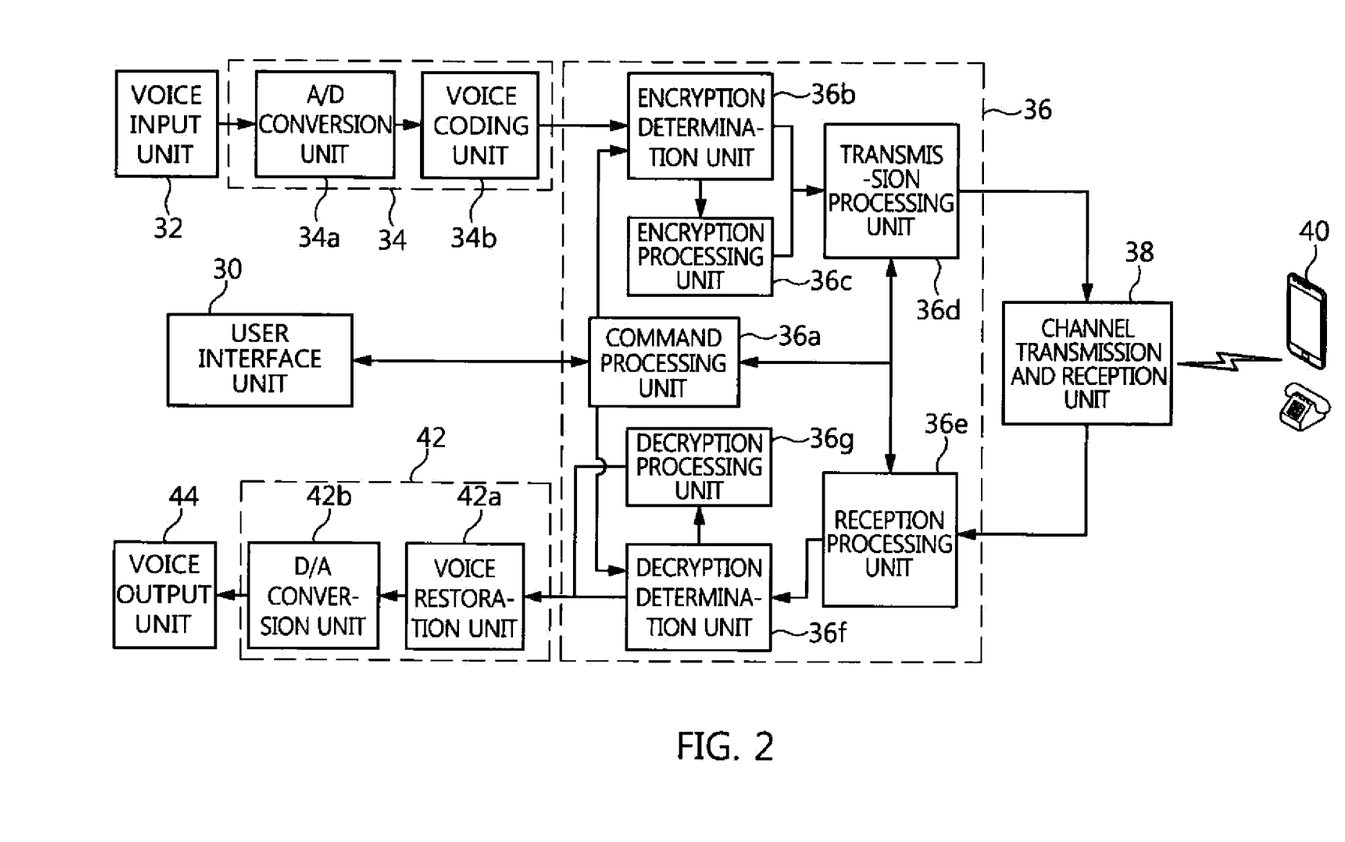
FIG. 2 is a diagram illustrating the internal configuration of the information security attachment device for voice communication according to an embodiment of the present invention.

FIG. 2 is a diagram illustrating the internal configuration of the information security attachment device for voice communication according to an embodiment of the present invention.

The information security attachment device for voice communication according to an embodiment of the present invention includes a user interface unit 30, a voice input unit 32, a compression unit 34, an encryption and decryption unit 36, a channel transmission and reception unit 38, a conversion unit 42, and a voice output unit 44.

The user interface unit 30 receives an information security request from a user, and displays whether or not information security is being performed. The user interface unit 30 may include an input unit configured to receive a request for and the termination of a call and a request for and the termination of information security, and a display unit configured to indicate call status and whether or information security is being performed. Although the input unit and the display unit are not illustrated in FIG. 2, those skilled in the art will readily understand that the input unit and the display unit are included in the user interface unit 30. Furthermore, the input unit may be understood to include an information security request button that is turned on/off by a user.

The voice input unit 32 receives a voice signal form a user.

The compression unit 34 digitizes and compresses the voice signal of the user received from the voice input unit 32. The compression unit 34 may include an A/D conversion unit 34a configured to convert the analog voice signal of the user, received from the voice input unit 32, into digital data (e.g., PCM data), and a voice coding unit 34b configured to compress the digital data (e.g., PCM data) output from the A/D conversion unit 34a.

Based on the information security request from the user, the encryption and decryption unit 36 encrypts the voice data compressed by the compression unit 34, and then sends the encrypted voice data to a terminal 40. Furthermore, in response to an information security control command from the terminal 40, the encryption and decryption unit 36 decrypts the encrypted voice data received from the terminal 40, and then outputs the decrypted voice data.

In common call mode, the encryption and decryption unit 36 may generate an information security control message corresponding to an information security request received via the user interface unit 30 in response to the information security request, may send the information security control message to the terminal 40, may perform the exchange of keys with a counterpart information security attachment device, may encrypt compressed voice data when the exchange of keys is completed, and may send the compressed voice data to the terminal 40 or request the terminal 40 to send compressed voice data.

When an information security control command is received from the terminal 40 in common call mode, the encryption and decryption unit 36 may enter information security control mode, may perform the exchange of keys with the encryption and decryption unit (not shown) of a counterpart information security attachment device, may decrypt voice data received by the terminal 40 and encrypted by the counterpart information security attachment device when the exchange of keys is completed, and may output the decrypted voice data.

That is, in order to perform an information security function, the encryption and decryption unit 36 may exchange encryption keys required for encryption and decryption with the counterpart information security attachment device through a key exchange protocol, and may then perform an information security function on the voice data based on the encryption keys.

The encryption and decryption unit 36 may include a command processing unit 36a, an encryption determination unit 36b, an encryption processing unit 36c, a transmission processing unit 36d, a reception processing unit 36e, a decryption determination unit 36f, and a decryption processing unit 36g.

The command processing unit 36a generates an information security control command based on the information security request received from the user interface unit 30. Furthermore, the command processing unit 36a determines whether or not to perform information security by analyzing the information security control command received from the terminal 40. That is, the command processing unit 36a determines the initiation and termination of the information security function by analyzing information security control commands received via the user interface unit 30 and the reception processing unit 36e, and controls the encryption determination unit 36b, the encryption processing unit 36c, the decryption determination unit 36f, and the decryption processing unit 36g that perform functions required to generate an information security channel.

The encryption determination unit 36b activates information security mode for voice data compressed by the compression unit 34 in response to the information security control command received from the command processing unit 36a. That is, the encryption determination unit 36b transfers voice data, received from the voice coding unit 34b, to the encryption processing unit 36c or the transmission processing unit 36d depending on the status of the information security request.

When information security mode is activated by the encryption determination unit 36b, the encryption processing unit 36c encrypts the voice data compressed by the compression unit 34.

The transmission processing unit 36d sends an information security control command, generated by the command processing unit 36a, to the terminal 40. Furthermore, the transmission processing unit 36d sends voice data, encrypted by the encryption processing unit 36c, to the terminal 40. If the information security control command (also called the information security control message) is received via the command processing unit 36a during a call, the transmission processing unit 36d connects the information security control command and the identifier of the information security control command, and sends the information security control command instead of voice information to the terminal 40 in an in-band signaling manner. In contrast, if the information security control command is not received, the transmission processing unit 36d sends the voice information to the terminal 40.

The reception processing unit 36e sends the information security control command received from the terminal 40 (i.e., an information security control command transmitted by a counterpart information security attachment device) to the command processing unit 36a, and sends voice data received from the terminal 40 to the decryption determination unit 36f. In other words, the reception processing unit 36e determines whether or not a command identifier is present in a message received from the channel transmission and reception unit 38 during a call. If the command identifier is present, the reception processing unit 36e determines the received message to be an information security control command, and then sends the received message to the command processing unit 36a. If the command identifier is not present, the reception processing unit 36e determines the received message to be voice information, and then sends the received message to the decryption determination unit 36f.

When information security mode is activated by the command processing unit 36a, the decryption determination unit 36f determines to decrypt voice data received from the terminal 40.

When the decryption determination unit 36f determines to decrypt the voice data, the decryption processing unit 36g decrypts the voice data received from the terminal 40.

It may be understood that the encryption determination unit 36b and the decryption determination unit 36f determine whether or not to perform a security function on digital voice information based on setting information regarding an information security function that has been processed by the command processing unit 36a.

It may be understood that the encryption processing unit 36c and the decryption processing unit 36g perform an information security function on received digital voice information using an encryption algorithm based on setting information regarding the information security function that has been processed by the command processing unit 36a. User voice can be safely protected against wire tapping in a channel through the encryption processing unit 36c and the decryption processing unit 36g while the user voice is being transmitted.

In FIG. 2, the channel transmission and reception unit 38 performs the transmission and reception of voice data and the transmission and reception of information security control commands between the encryption and decryption unit 36 and the terminal 40. In other words, the channel transmission and reception unit 38 converts data into data suitable for a channel through which the data is transmitted by performing processing, such as channel coding, interleaving, and modulation, on the data, and then sends the converted data. Furthermore, the channel transmission and reception unit 38 restores data by performing processing, such as demodulation, deinterleaving, and channel decoding, on a signal received via the channel. The information security attachment device for voice communication according to an embodiment of the present invention is connected to a commercial mobile terminal or wired telephone through the channel transmission and reception unit 38, and then performs a voice communication function.

The conversion unit 42 restores voice data, decrypted by and received from the encryption and decryption unit 36, to an analog voice signal, and outputs the analog voice signal. The conversion unit 42 may include a voice restoration unit 42a configured to restore the compressed voice data, received from the encryption and decryption unit 36, to the original digital data (e.g., PCM data), and a D/A conversion unit 42b configured to convert the digital data, received from the voice restoration unit 42a, into an analog voice signal.

The voice output unit 44 outputs the analog voice signal received from the conversion unit 42 so that a user can listen to the analog voice signal.

The operating principle of the information security attachment device for voice communication according to an embodiment of the present invention will be described below based on an example in which an information security request is made while a common call is being performed.

First, a transmission function will be described in common call mode, information security call mode, and information security control mode.

In common call mode, an analog voice signal received via the voice input unit 32 is converted into digital voice data (e.g., PCM data) via the A/D conversion unit 34a. The generated voice data (e.g., PCM data) is input to the voice coding unit 34b and compressed by the voice coding unit 34b.

The compressed voice data input to the encryption determination unit 36b is directly transferred to the transmission processing unit 36d without passing through the encryption processing unit 36c because current mode is common call mode. The transmission processing unit 36d transfers the voice data to the channel transmission and reception unit 38 because there is no information security control message received from the command processing unit 36a. Accordingly, the channel transmission and reception unit 38 sends the voice data to the mobile terminal or wired telephone 40 connected thereto.

In common call mode, when an information security request is received via the user interface unit 30, the command processing unit 36a generates an information security control message and transfers the information security control message to the transmission processing unit 36d. When the information security control message is received, the transmission processing unit 36d transfers the information security control message instead of voice data to the channel transmission and reception unit 38. The channel transmission and reception unit 38 transfers the received information security control message to the mobile terminal or wired telephone 40 so that the received information security control message is transferred to the information security attachment device of a counterpart. Here, a process of transmitting and receiving the information security control message may be called information security control mode.

Once a key exchange protocol has been performed by exchanging the information security control messages, the information security attachment devices for voice communication on both sides enter information security call mode from common call mode. Once information security call mode has been entered, voice data compressed via the voice input unit 32, the A/D conversion unit 34a and the voice coding unit 34b is input to the encryption determination unit 36b, like in common call mode. Unlike in common call mode, the encryption determination unit 36b transfers the voice data to the encryption processing unit 36c so that the voice data is protected because current mode is information security call mode. Accordingly, the voice data whose information has been secured is transferred to the transmission processing unit 36d. Here, the transmission processing unit 36d transfers the voice data whose information has been secured to the channel transmission and reception unit 38 because there is no message requested by the command processing unit 36a. Accordingly, the channel transmission and reception unit 38 sends the voice data whose information has been secured to the mobile terminal or wired telephone 40 connected thereto.

A reception function will be described below in common call mode, information security call mode, and information security control mode.

In common call mode, data received via the channel transmission and reception unit 38 is transferred to the reception processing unit 36e. The reception processing unit 36e checks whether the received data is not an information security control message, and outputs the received data to the decryption determination unit 36f. The decryption determination unit 36f directly transfers the data to the voice restoration unit 42a because current mode is common call mode. The voice restoration unit 42a restores the PCM data received from compressed voice data, and outputs the restored PCM data to a user using the voice output unit 44 via the D/A conversion unit 42b.

If data received via the channel transmission and reception unit 38 is determined to be an information security control message, not voice data, in common call mode, that is, when an information security control message (also be called an information security control command) is received from a counterpart information security attachment device, the reception processing unit 36e transfers the received data to the command processing unit 36a. If the information security control message is a normal information security control message, the command processing unit 36a enters information security control mode, and notifies the user interface unit 30 that current mode is information security control mode. Accordingly, the user interface unit 30 displays current information security control status. Furthermore, if it is necessary to transfer the received information security control message to the counterpart information security attachment device for voice communication according to the procedure of a key exchange protocol in a process of processing the received information security control message, the command processing unit 36a requests the transmission processing unit 36d to send the information security control message to the counterpart information security attachment device for voice communication.

When the procedure of a key exchange protocol is completed by exchanging the information security control messages, the information security attachment devices for voice communication on both sides enter information security call mode. When information security call mode is entered, the reception processing unit 36e checks that digital data received via the channel transmission and reception unit 38 is not an information security control message, and transfers the digital data to the decryption determination unit 36f. Unlike in common call mode, the decryption determination unit 36f transfers the received data to the decryption processing unit 36g so that voice data whose information has been secured is decrypted into compressed voice data of plain text because current mode is information security call mode. The decrypted compressed voice data is output to a user via the voice restoration unit 42a, the D/A conversion unit 42b, and the voice output unit 44.

Figure 3:
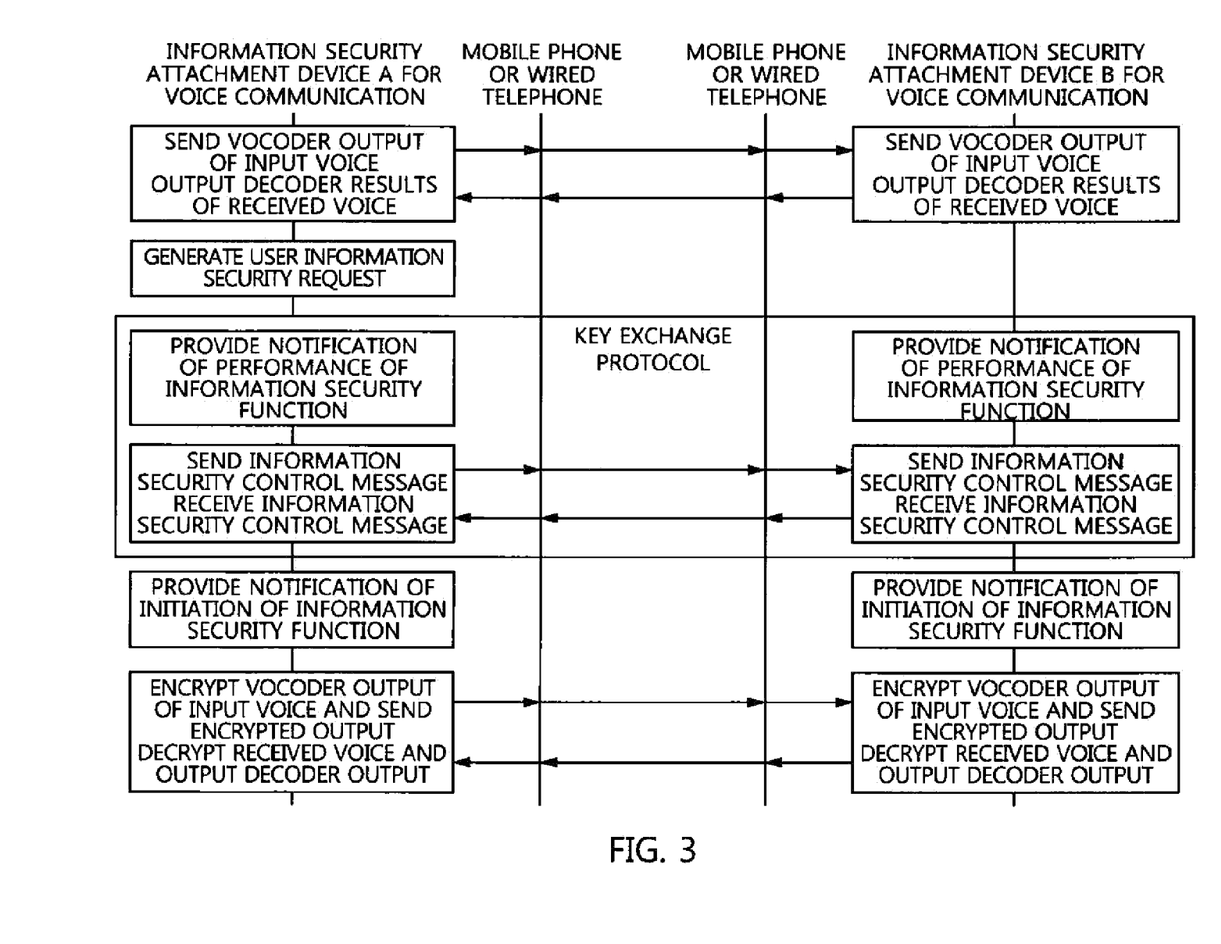
FIG. 3 is a diagram illustrating a method of processing the voice communication information security function of the information security attachment device for voice communication according to an embodiment of the present invention.

FIG. 3 is a diagram illustrating a method of processing the voice communication information security function of the information security attachment device for voice communication according to an embodiment of the present invention.

When the user of an information security attachment device A for voice communication that performs a common voice call requests information security via the user interface unit 30, the information security attachment device A for voice communication notifies the user that an information security procedure is being performed. The command processing unit 36a generates an information security control message required to perform a key exchange protocol, and requests the transmission processing unit 36d to send the information security control message instead of voice information. Accordingly, the information security control message is transmitted from the transmission processing unit 36d of the information security attachment device A for voice communication to an information security attachment device B for voice communication via the channel transmission and reception unit 38. When the information security control message instead of voice information is received, the reception processing unit 36e of the information security attachment device B for voice communication transfers the received information security control message to the command processing unit 36a. The command processing unit 36a of the information security attachment device B for voice communication provides notification that an information security procedure has been entered via the user interface unit 30 of the information security attachment device B, and performs a key exchange protocol required to form an information security channel based on the received information security control message. If it is necessary to send a message according to the procedure of the key exchange protocol, the command processing unit 36a generates an information security control message to be transmitted to the information security attachment device A, and transfers the generated information security control message to the transmission processing unit 36d.

When the execution of the key exchange protocol is completed between the information security attachment device A for voice communication and the information security attachment device B for voice communication according to the above-described procedure, the information security channel has been set up. Once the information security channel has been set up, the command processing units 36a of the information security attachment device A and the information security attachment device B notifies the respective user interface units 30 of the initiation of information security, and thus all pieces of subsequent user voice information are protected and transmitted.

Figure 4:
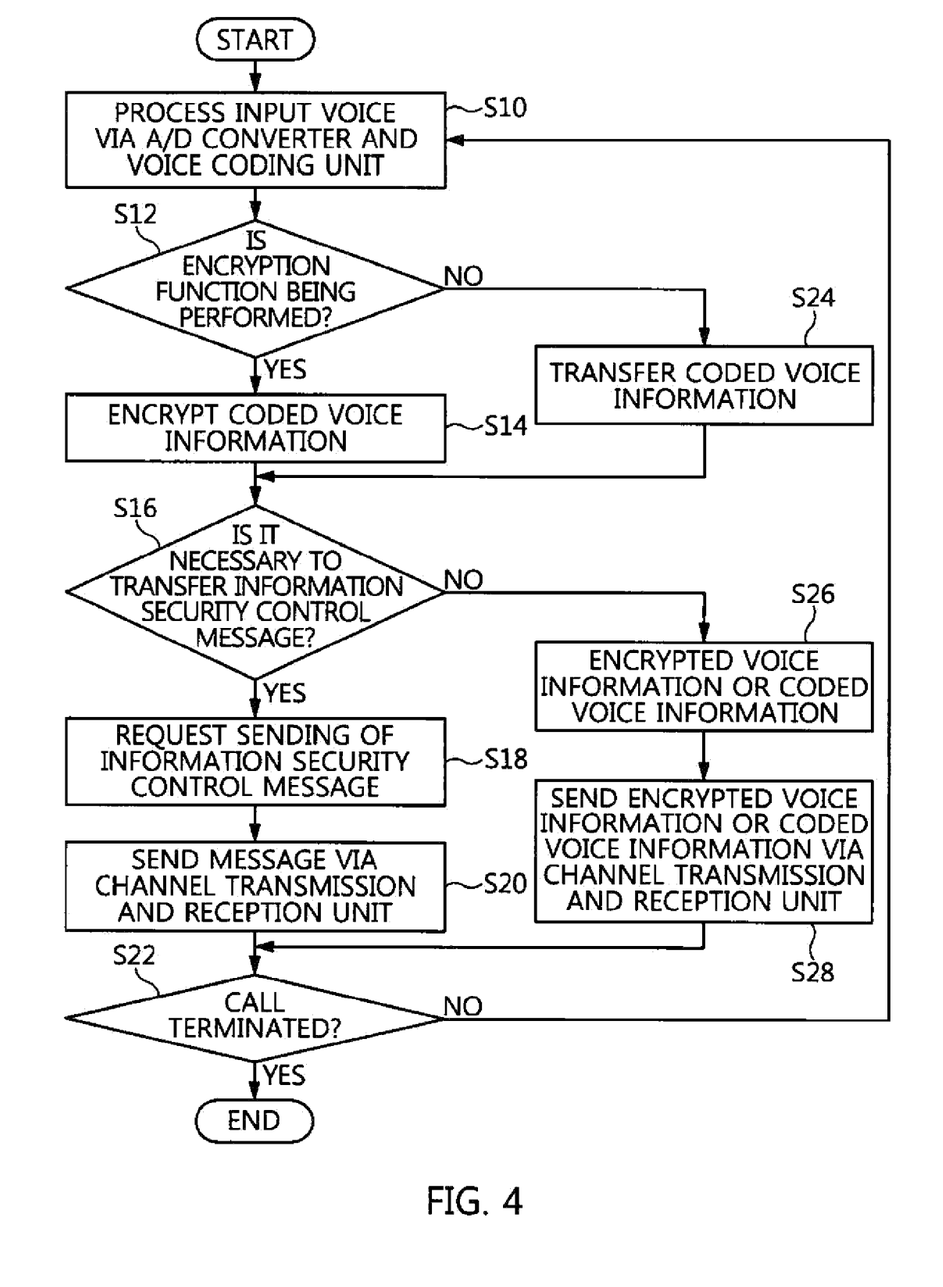
FIG. 4 is a flowchart illustrating the voice transmission function of an information security method for voice communication according to an embodiment of the present invention.

FIG. 4 is a flowchart illustrating the voice transmission function of an information security method for voice communication according to an embodiment of the present invention.

First, when the transmission of voice information starts, digitally coded voice information is generated via the voice input unit 32, the A/D conversion unit 34a and the voice coding unit 34b, and then transferred to the encryption determination unit 36b at step S10.

The encryption determination unit 36b determines whether or not to encrypt the voice information by determining whether or not an information security function for voice communication has been activated at step S12.

If, as a result of the determination, it is determined that the voice information needs to be encrypted ("YES" at step S12), the encryption determination unit 36b sends the voice information to the encryption processing unit 36c. The encryption processing unit 36c encrypts the voice information and transfers the encrypted voice information to the transmission processing unit 36d at step S14.

If, as a result of the determination, it is determined that the voice information does not need to be encrypted ("NO" at step S12), the encryption determination unit 36b directly transfers the coded voice information to the transmission processing unit 36d so that the transmission processing unit 36d sends the coded voice information at step S24.

Next, the transmission processing unit 36d determines whether or not an information security control message transmission request from the command processing unit 36a is present at step S16.

If, as a result of the determination, it is determined that the information security control message transmission request is present ("YES" at step S16), the transmission processing unit 36d transfers an information security control message to the channel transmission and reception unit 38 and also requests the channel transmission and reception unit 38 to send the information security control message at step S18. In response to the request, the channel transmission and reception unit 38 sends the information security control message to the terminal 40 (e.g., the mobile terminal or wired telephone) of a counterpart at step S20.

In contrast, if, as a result of the determination, it is determined that the information security control message transmission request is not present ("NO" at step S16), the transmission processing unit 36d transfers previously encrypted voice information or coded voice information to the channel transmission and reception unit 38 at step S26. Accordingly, the, channel transmission and reception unit 38 sends the encrypted voice information or the coded voice information to the terminal 40 (e.g., a mobile terminal or a wired telephone) of a counterpart at step S28.

The above-described voice transmission function is repeatedly performed until the voice communication is terminated ("YES" at step S22).

Figure 5:
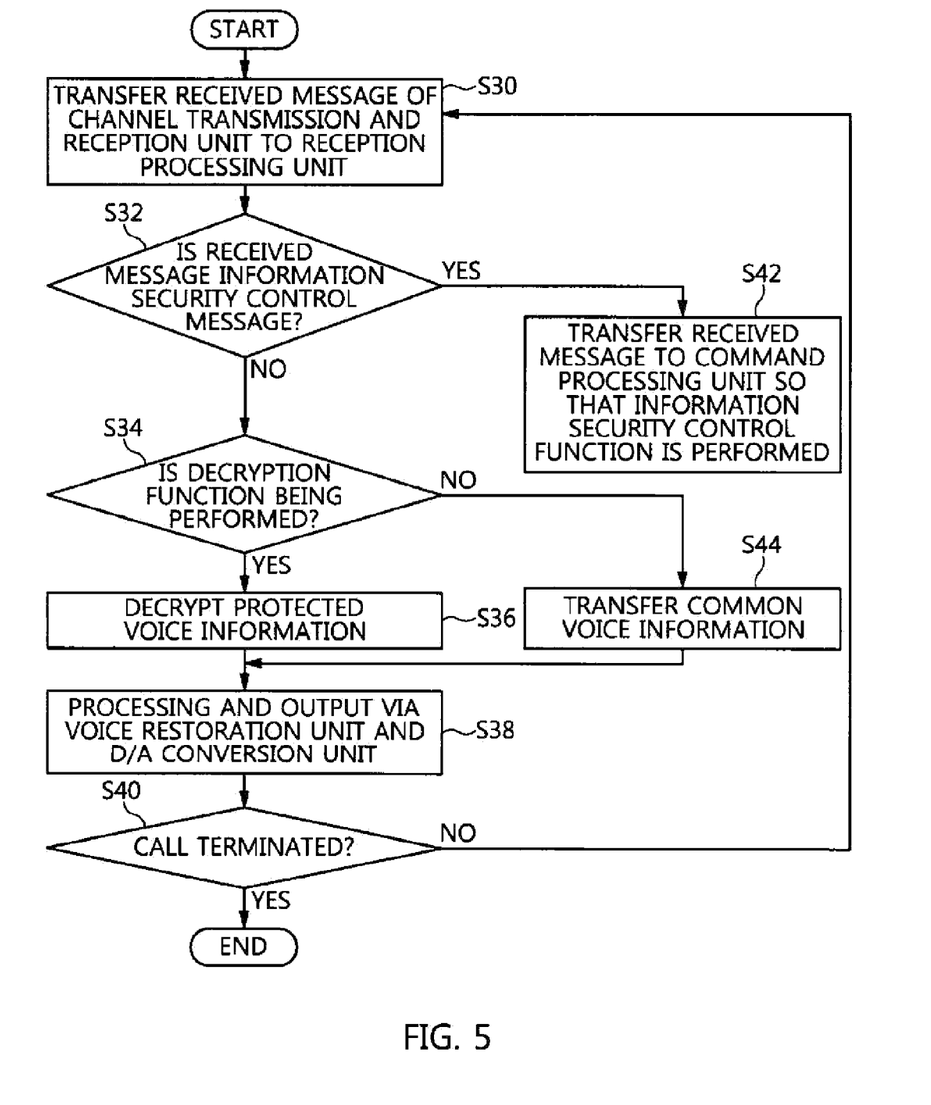
FIG. 5 is a flowchart illustrating the voice reception function of an information security method for voice communication according to an embodiment of the present invention.

FIG. 5 is a flowchart illustrating the voice reception function of an information security method for voice communication according to an embodiment of the present invention.

First, when the reception of voice information transmitted by the terminal 40 (e.g., a mobile terminal or a wired telephone) starts, the channel transmission and reception unit 38 transfers the received message to the reception processing unit 36e at step S30.

The reception processing unit 36e determines whether or not the received message is an information security control message by analyzing the received message at step S32.

If, as a result of the determination, it is determined that the received message is an information security control message ("YES" at step S32), the reception processing unit 36e transfers the received message to the command processing unit 36a and the command processing unit 36a performs an information security control function on the received message at step S42.

If, as a result of the determination, it is determined that the received message is not an information security control message ("NO" at step S32), the reception processing unit 36e transfers the received message to the decryption determination unit 36f.

Next, the decryption determination unit 36f determines whether or not information security has been activated at step S34.

If, as a result of the determination at step S34, it is determined that the received message needs to be decrypted in response to the activation of information security call mode, the decryption determination unit 36f transfers the voice information, received from the reception processing unit 36e, to the decryption processing unit 36g. The decryption processing unit 36g decrypts the secured voice information and transfers the decrypted voice information to the voice restoration unit 42a at step S36.

In contrast, if, as a result of the determination at step S34, it is determined that the received message does not need to be decrypted, the decryption determination unit 36f directly transfers the voice information, received from the reception processing unit 36e, to the voice restoration unit 42a at step S44.

The voice information transferred to the voice restoration unit 42a as described above is voice information in digitally coded form. Thus, the voice information is converted into a form which can be listened to via the voice restoration unit 42a, the D/A conversion unit 42b and the voice output unit 44 and is then output at step S38.

Like the voice transmission function, the above-described voice reception function is repeatedly performed until the voice communication is terminated ("YES" at step S40).

As described above, the present invention can protect the voice information of a user without an additional change or function using a commercial mobile terminal or digital wired telephone to which a Bluetooth headset or a receiver can be connected.

If users on both sides who make a call by connecting the information security attachment devices for voice communication according to the present invention to their commercial mobile terminals or digital wired telephones want to protect voice information and when the user presses the information security request button of the information security attachment device, a key exchange protocol is performed between the information security attachment devices in an in-band signaling manner, and thus an end-to-end information security channel is set up. Accordingly, illegal wire tapping and eavesdropping by a third party can be prevented because voice information is exchanged via the information security channel set up between the information security attachment devices on both sides.

That is, user voice information can be protected in an end-to-end manner without an additional change of or an addition function for a commercial mobile terminal or wired telephone to which a device, such as a headset or a wireless telephone receiver, can be connected.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. An information security device for voice communications between terminals in a network, comprising:
one or more units being configured and executed by a processor using algorithms which associated with least one non-transitory storage device, the algorithms which when executed, causes the processor to perform the one or more units, the one or more units comprising,
a user interface unit configured to receive an information security request from a user, and to display whether or not information security is being performed;
a compression unit configured to compress a voice signal received from the user by digitizing the voice signal;
an encryption and decryption unit configured to encrypt the compressed voice data in response to detection of an information security request from the user or in response to detection of an information security control command of a counterpart information security attachment device,
the encryption being performed by exchanging keys between a terminal of the user and the counterpart information security attachment device to make the voice data in security based on the keys, the keys for encryption and decryption the voice data through key exchange protocol, and
in response to detection of completion of the exchanging keys,
to request the terminal of the user to send the encrypted voice data,
to decrypt the encrypted voice data received from the terminal in response to detection of an information security request or in response to detection of an information security control command of the counterpart information security attachment device, and
to output the decrypted voice data; and
a conversion unit configured to restore the voice data decrypted by the encryption and decryption unit to an analog voice signal, and to output the restored analog voice signal.

2. The information security attachment device of claim 1, wherein when the information security request or the information security control command of the counterpart information security attachment device is received in common call mode, the encryption and decryption unit enters information security control mode, exchanges keys with the counterpart information security attachment device, encrypts the compressed voice data when the exchange of keys is completed, and requests the terminal to send the encrypted voice data.

3. The information security attachment device of claim 1, wherein when the information security request or the information security control command of the counterpart information security attachment device is received in common call mode, the encryption and decryption unit enters information security control mode, exchanges keys with the counterpart information security attachment device, decrypts the encrypted voice data received from the terminal when the exchange of keys is completed, and outputs the decrypted voice data.

4. The information security attachment device of claim 1, wherein the key exchange protocol is configured to perform an information security function, and to perform the information security function on the voice data based on the encryption key.

5. The information security attachment device of claim 1, wherein the encryption and decryption unit comprises:
 a command processing unit configured to generate an information security control command in response to the information security request, and to determine whether or not to perform information security by analyzing the information security control command received from the terminal;
 an encryption determination unit configured to activate information security mode for the voice data, compressed by the compression unit, in response to the information security control command from the command processing unit;
 an encryption processing unit configured to encrypt the voice data compressed by the compression unit when the information security mode is activated by the encryption determination unit;
 a transmission processing unit configured to send the information security control command of the command processing unit to the terminal, and to send the voice data encrypted by the encryption processing unit to the terminal;
 a decryption determination unit configured to determine whether or not to decrypt the voice data received by the terminal when the information security mode is activated by the command processing unit;
 a decryption processing unit configured to decrypt the voice data received by the terminal when the decryption determination unit determines to decrypt the received voice data; and
 a reception processing unit configured to send the information security control command, received by the terminal, to the command processing unit, and to send the voice data, received by the terminal, to the decryption determination unit.

6. The information security attachment device of claim 5, wherein the transmission processing unit connects the information security control command and an identifier of the information security control command when the information security control command is received via the command processing unit, and sends the information security control command instead of the voice data to the terminal in an in-band signaling manner.

7. The information security attachment device of claim 6, wherein the transmission processing unit sends the voice data, encrypted by the encryption processing unit, to the terminal in response to detection of information security call mode entered by exchanging the information security control commands with the terminal.

8. The information security attachment device of claim 5, wherein the decryption processing unit performs a decryption operation on the encrypted voice data received from the reception processing unit using a method corresponding to the encryption processing unit, and sends results of the decryption operation to the conversion unit.

9. The information security attachment device of claim 5, wherein the command processing unit determines initiation and termination of an information security function by analyzing the information security control command received via the user interface unit and the reception processing unit.

10. The information security attachment device of claim 1, wherein the user interface unit comprises:
 an input unit configured to receive a request for and termination of a call and a request for and termination of information security; and
 a display unit configured to display call status and whether or not information security is being performed.

11. The information security attachment device of claim 1, further comprising:
 a channel transmission and reception unit configured to transmit and receive the voice data and the information security control command between the encryption and decryption unit and the terminals.

12. The information security attachment device of claim 1, wherein the terminal of the user comprises at least one of a mobile terminal and a wired telephone.

13. A computer implemented information security method between two terminals in a network for voice communication, comprising:
 receiving, by a hardware processor, an information security request from a user, and displaying whether or not information security is being performed;
 compressing, by a hardware processor, a voice signal received from the user by digitizing the voice signal;
 encrypting, by a hardware processor, the compressed voice data in response to detection of an information security request from the user or in response to detection of an information security control command of a counterpart information security attachment device, the encryption being performed by exchanging keys between a terminal of the user and the counterpart information security attachment device to make the voice data in security based on the keys, the keys for encryption and decryption the voice data through key exchange protocol and
 in response to detection of completion of the exchange keys, requesting, by a hardware processor, the terminal of the user or the counterpart information security attachment device to send the encrypted voice data;
 decrypting, by a hardware processor, encrypted voice data received from the terminal in response to detection of an information security request or in response to detection of an information security control command of the counterpart information security attachment device, outputting the decrypted voice data;
 restoring, by a hardware processor, the decrypted and output voice data to an analog voice signal and outputting the restored voice signal.

14. The information security method of claim 13, wherein encrypting the compressed voice data and sending the encrypted voice data to the terminal comprises:
 entering information security control mode when the information security request or the information security control command is received in common call mode, and exchanging keys with the counterpart information security attachment device; and encrypting the compressed voice data when the exchange of keys is completed, and requesting the terminal to send the encrypted voice data.

15. The information security method of claim 13, wherein decrypting the encrypted voice data and outputting the decrypted voice data comprises:

entering information security control mode when the information security request or the information security control command is received in common call mode, and exchanging keys with the counterpart information security attachment device; and decrypting the encrypted voice data received from the terminal when the exchange of keys is completed, and outputting the decrypted voice data.

* * * * *